(12) United States Patent
Urase et al.

(10) Patent No.: US 10,180,024 B2
(45) Date of Patent: Jan. 15, 2019

(54) CONTROL DEVICE FOR OPENING AND CLOSING BODIES OF VEHICLES

(71) Applicant: AISIN SEIKI KABUSHIKI KAISHA, Kariya-shi (JP)

(72) Inventors: Hiroshi Urase, Kariya (JP); Kohei Kobayashi, Ichinomiya (JP); Takeshi Nishikibe, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/518,670

(22) PCT Filed: Sep. 24, 2015

(86) PCT No.: PCT/JP2015/076949
§ 371 (c)(1),
(2) Date: Apr. 12, 2017

(87) PCT Pub. No.: WO2016/072168
PCT Pub. Date: May 12, 2016

(65) Prior Publication Data
US 2017/0234050 A1 Aug. 17, 2017

(30) Foreign Application Priority Data
Nov. 4, 2014 (JP) .................................. 2014-224585

(51) Int. Cl.
*B60J 5/06* (2006.01)
*E05D 15/06* (2006.01)
(Continued)

(52) U.S. Cl.
CPC ............... *E05F 15/659* (2015.01); *B60J 5/06* (2013.01); *E05D 15/0608* (2013.01); *E05D 15/101* (2013.01); *E05Y 2900/531* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,208,102 | B1* | 3/2001 | Kikuchi | ............... G05B 19/416 318/282 |
| 2002/0093301 | A1* | 7/2002 | Itami | ...................... G05B 19/40 318/452 |
| 2007/0241585 | A1* | 10/2007 | Shimizu | .................. E05F 15/44 296/146.6 |

FOREIGN PATENT DOCUMENTS

| | | |
|---|---|---|
| JP | 2003-182368 A | 7/2003 |
| JP | 2011-236697 A | 11/2011 |

OTHER PUBLICATIONS

International Search Report dated Dec. 8, 2015, in PCT/JP2015/076949 filed Sep. 24, 2015.

* cited by examiner

*Primary Examiner* — Aaron L Troost
(74) *Attorney, Agent, or Firm* — Oblon, McClelland, Maier & Neustadt, L.L.P.

(57) ABSTRACT

A control device for opening and closing bodies of vehicles comprises a driving device that drives an opening and closing body of a vehicle and a controlling unit that controls operation of the driving device. The controlling unit is configured so as to cause the opening and closing body to move while controlling the speed of the opening and closing body movement by executing speed feedback control and to set a plurality of control regions over the range of movement of the opening and closing body and change control properties for the speed feedback control in each of the control regions.

5 Claims, 4 Drawing Sheets

(51) Int. Cl.
*E05F 15/659* (2015.01)
*E05D 15/10* (2006.01)

CONTROL DEVICE FOR OPENING AND CLOSING BODIES OF VEHICLES

TECHNICAL FIELD

The present invention relates to a vehicle opening-closing body controller.

BACKGROUND ART

A vehicle opening-closing body controller that moves an opening-closing body of a vehicle with a drive source, such as the power sliding door device described in patent document 1, controls the speed of the opening-closing body in accordance with the movement position of the opening-closing body when moving the opening-closing body between a fully open position and a fully closed position. Speed feedback control is performed so that the actual movement speed of the opening-closing body matches the target speed. This reduces the influence of external disturbance such as the application of an external input or the tilt of the vehicle.

PRIOR ART DOCUMENT

Patent Document

Patent Document 1: Japanese Laid-Open Patent Publication No. 2011-236697

SUMMARY OF THE INVENTION

Problems that are to be Solved by the Invention

When the opening-closing body is a heavy object like a sliding door, it is difficult to optimize the control characteristic of the speed feedback control. More specifically, when raising the responsivity of speed feedback control to increase the target speed matching capability, hunting has a tendency to occur in the movement speed. When a low responsivity is set because stability is a significant factor, the target speed matching capability falls.

It is an object of the present invention to provide a vehicle opening-closing body controller that stably opens and closes an opening-closing body and obtains a high target speed matching capability while reducing hunting in the movement speed.

Means for Solving the Problem

A vehicle opening-closing body controller that solves the above problem includes a driver that drives an opening-closing body of a vehicle and a control unit that controls operation of the driver. The control unit is configured to move the opening-closing body while controlling movement speed of the opening-closing body by executing speed feedback control and set a plurality of control regions in a movement route of the opening-closing body and change a control characteristic of the speed feedback control for each control region.

EMBODIMENTS OF THE INVENTION

A vehicle opening-closing body controller embodied in a power sliding door device will now be described with reference to the drawings.

Figure 1:
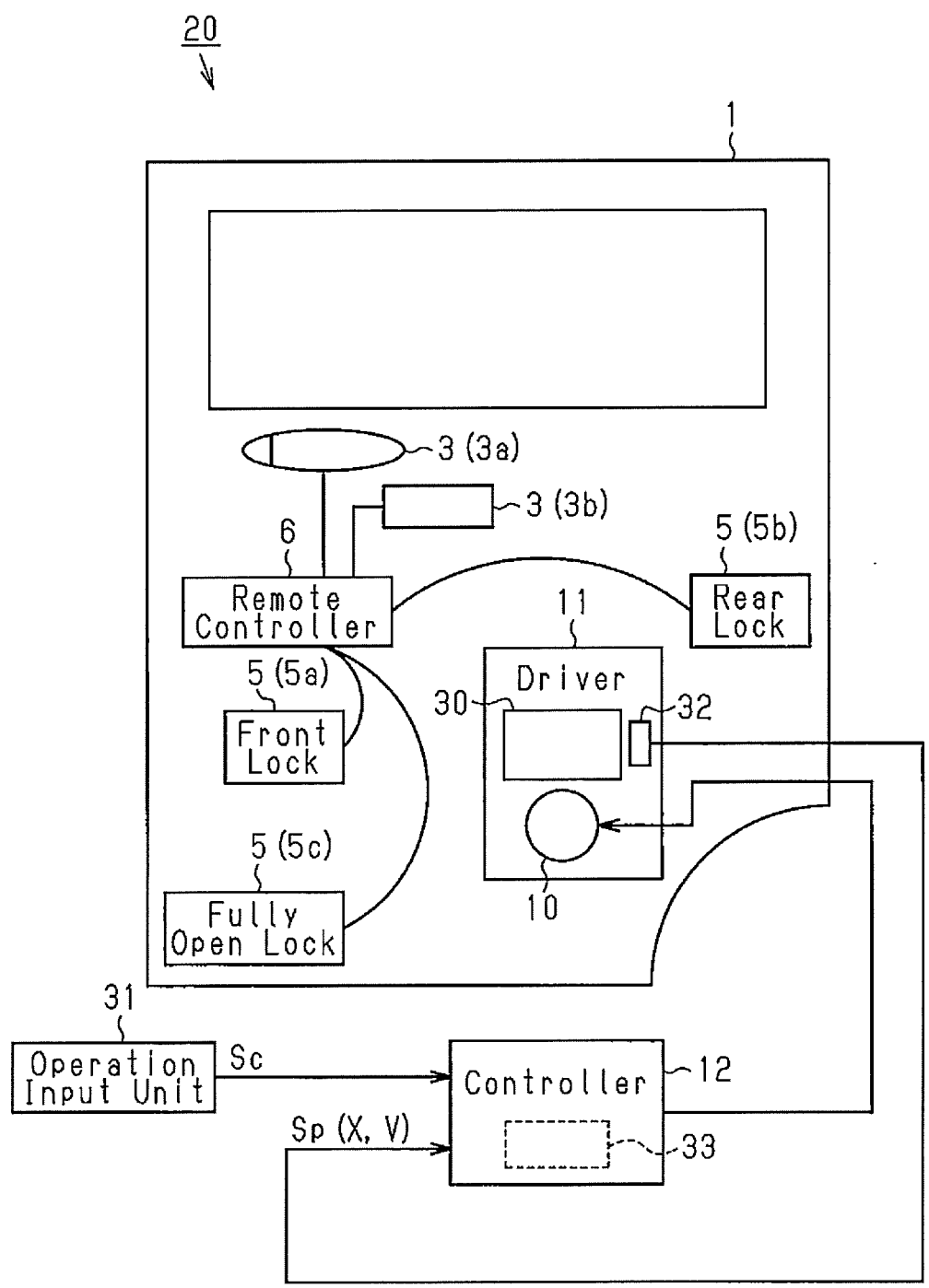
FIG. 1 is a schematic diagram of a power sliding door device.

As shown in FIG. 1, a sliding door 1 (opening-closing body) is supported by a side surface of a vehicle (not shown) and moved in a forward-rearward direction to open and close a door opening in the side surface of the vehicle. More specifically, the sliding door 1 is moved toward the front of the vehicle (leftward in FIG. 1) and shifted to a fully closed state when closing the door opening. Further, the sliding door 1 is moved toward the rear of the vehicle (rightward in FIG. 1) and shifted to a fully open state when the sliding door 1 opens the door opening and allows vehicle occupants to enter and exit the vehicle through the door opening. The sliding door 1 includes an outside door handle 3a and an inside door handle 3b that are used to open and close the sliding door 1.

The sliding door 1 includes a plurality of lock devices 5. The lock devices 5 include a front lock 5a and a rear lock 5b that serve as full closing locks that constrain the sliding door 1 at a fully closed position. The lock devices 5 further include a fully open lock 5c that constrains the sliding door 1 at a fully open position. Each lock device 5 (latch mechanism) is connected to the door handles 3 by a remote controller 6.

The door handles 3 are operated to release the sliding door 1 from the constraint of the lock devices 5. The door handles 3, which serve as gripping portions, may be used to manually open or close the sliding door 1.

A vehicle occupant may remotely release the sliding door 1 from the constraint of the lock devices 5 by operating an operation switch, which is located in the passenger compartment or on a portable device. Further, the sliding door 1 includes a driver 11, which uses a motor 10 as a drive source, and a controller 12, which controls the operation of the driver 11 through the supply of drive power to the motor 10. In the present embodiment, this forms a power sliding door device 20 that allows the sliding door 1 to open or close in accordance with the driving force of the motor 10.

Figure 2:
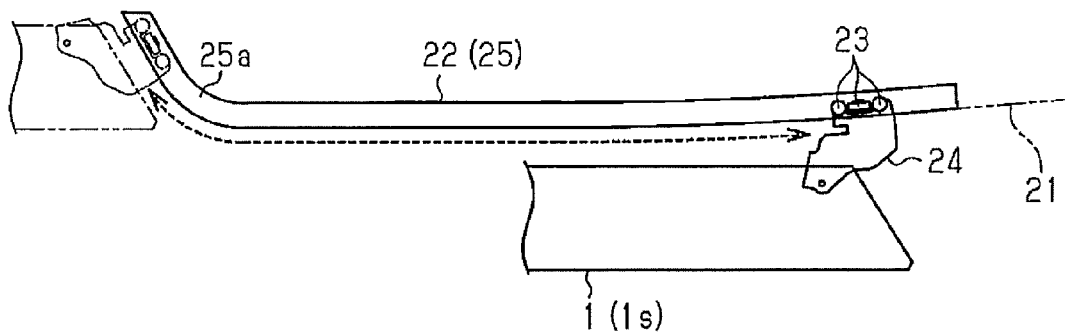
FIG. 2 is a diagram showing a guide rail, which is arranged on a side surface of a vehicle body, and a sliding door movement path, which is formed by the guide rail.

In detail, as shown in FIG. 2, a guide rail 22 (center rail) is arranged on a vehicle body side surface 21 extending in the forward-rearward direction of the vehicle (sideward direction as viewed in FIG. 2). More specifically, the end of the guide rail 22 located toward the front of the vehicle (left side as viewed in FIG. 2) is curved inward in the widthwise direction of the vehicle (upper side as viewed in FIG. 2). A guide roller unit 24, which includes guide rollers 23 that roll along a path formed by the guide rail 22, is arranged on the guide rail 22. The sliding door 1, which is supported by the guide roller unit 24 on the vehicle body side surface 21, is moveable in the forward-rearward direction of the vehicle and in the direction the guide rail 22 extends.

The sliding door 1 is arranged so that its design surface 1s is flush with the vehicle body side surface 21, on which the guide rail 22 is arranged, when the sliding door 1 is moved toward the front of the vehicle to the fully closed position (position shown by double-dashed line in FIG. 2). The guide rail 22 forms a movement path 25 of the sliding door 1 that includes a curved portion 25a corresponding to the shape of the guide rail 22. When located toward the rear of the vehicle (right side as viewed in FIG. 2) from the curved portion 25a, the sliding door 1 is positioned outward from the vehicle body side surface 21 in the widthwise direction of the vehicle (lower side as viewed in FIG. 2) in order to avoid interference with the vehicle body side surface 21.

As shown in FIG. 1, the driver 11 includes a drum 30 that is rotated by the drive force of the motor 10. The driver 11 has a known structure for driving and opening or closing the sliding door 1 with a drive cable (not shown) that is wound around the drum 30.

In the present embodiment, the door handles 3 and an operation input unit 31, which is arranged in the passenger compartment or on the portable device, send output signals (operation input signals Sc) to the controller 12. Based on the operation input signals Sc, the controller 12 detects an open-close request of the sliding door 1 generated by the user and controls the operation of the driver 11 to move the sliding door 1 in the requested movement direction.

In further detail, the driver 11 includes a pulse sensor 32 that outputs a pulse signal Sp, which is synchronized with the movement of the drum 30. The controller 12 detects the movement position X and the movement speed V of the sliding door 1 from the pulse signal Sp.

The controller 12, which serves as a control unit, is a processor or a control circuit formed by a microcomputer including a memory 33 (RAM, ROM, or the like), which stores control programs, and a CPU or the like, which executes various types of control in accordance with the control programs. The memory 33 also stores a target speed V* that is used when executing an opening-closing drive control on the sliding door 1. The controller 12 is configured to move the sliding door 1 in the opening direction or the closing direction while executing speed feedback control to match the detected movement speed V with the target speed V* of the sliding door 1.

Figure 3:
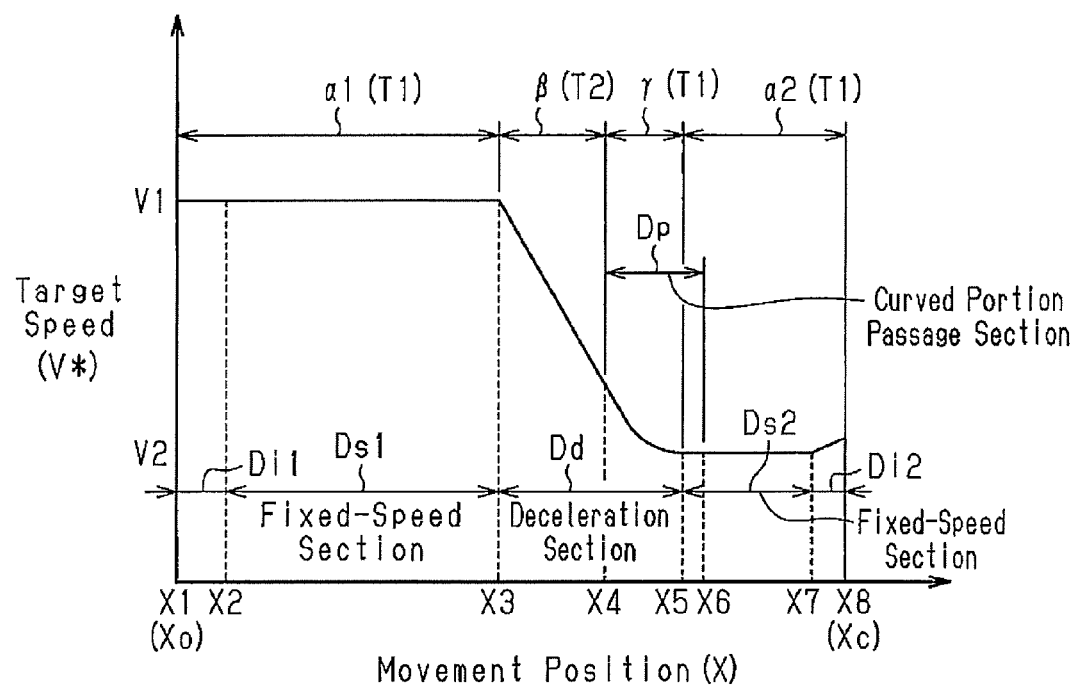
FIG. 3 is a diagram showing control regions that are set in the movement route of the sliding door and control cycles of the speed feedback control that are changed for each control region.

In detail, as shown in FIG. 3, for each drive mode of the sliding door 1, the controller 12 stores the target speed V* of the sliding door 1 corresponding to each movement position X of the sliding door 1 in the form of a map.

For example, in the drive mode shown in FIG. 3, the sliding door 1 is moved from the fully open position Xo to the fully closed position Xc. This drive mode keeps the target speed V* of the sliding door 1 fixed at a first movement speed V1 from a movement position X1, which corresponds to the fully open position Xo, to a movement position X3. When the sliding door moves from the movement position X1, the movement speed V of the sliding door 1 substantially reaches the first movement speed V1, which is the target speed V*, before the sliding door 1 reaches the movement position X2. Thus, the section from the movement position X1 to the movement position X2 is referred to as an acceleration section Di1. The section from the movement position X2 to the movement position X3 is referred to as a fixed-speed section Ds1, in which the movement speed V of the sliding door 1 is kept fixed at the first movement speed V1.

In the drive mode shown in FIG. 3, the section from the movement position X3 to the movement position X5 is referred to as a deceleration section Dd (varying-speed section), in which the target speed V* is gradually decreased from the first movement speed V1 to the second movement speed V2 as the sliding door 1 moves in the closing direction. Further, the section from the movement position X5 to the movement position X7 that follows the deceleration section Dd is referred to as a fixed-speed section Ds2, in which the target speed V* is kept fixed at the second movement speed V2, that is, the movement speed V of the sliding door 1 that has been decreased in the deceleration section Dd is kept fixed at the second movement speed V2. The movement position X7, which is the terminal end of the fixed-speed section Ds2, is set in the vicinity of the movement position X8, which corresponds to the fully closed position Xc. The section from the movement position X7 to the movement position X8 is referred to as an acceleration section Di2, in which the target speed V* (movement speed V) is gradually increased from the second movement speed V2.

The controller 12 sets a plurality of control regions ($\alpha 1$, $\alpha 2$, $\beta$, and $\gamma$) for such movement route of the sliding door 1, that is, the movement route from the movement position X1, which corresponds to the fully open position Xo, to the movement position X8, which corresponds to the fully closed position Xc in the drive mode shown in FIG. 3. In the same manner as the target speed V*, the memory 33 stores the control regions in correspondence with the movement position X of the sliding door 1 for each drive mode of the sliding door 1 in the present embodiment. The controller 12 is configured to change the control characteristic of the speed feedback control for each control region.

In further detail, the controller 12 sets the section from the movement position X1 (fully open position Xo) to the movement position X3 as a first control region $\alpha 1$. The first control region $\alpha 1$ corresponds to the fixed-speed section Ds1 (X2 to X3), in which the movement speed V of the sliding door 1 is kept fixed at the first movement speed V1. The controller 12 sets the section from the movement position X3 to the movement position X4 as a second control region $\beta$. The second control region $\beta$ corresponds to the deceleration section Dd (X3 to X5), in which the movement speed V of the sliding door 1 gradually decreases from the first movement speed V1 to the second movement speed V2. The controller 12 sets the section from the movement position X5 to the movement position X8 (fully closed position Xc) as the first control region $\alpha 2$. The first control region $\alpha 2$ corresponds to the fixed-speed section Ds2 (X5 to X7), in which the movement speed V of the sliding door 1 is kept fixed at the second movement speed V2.

When the sliding door 1 is in one of the first control regions $\alpha 1$ and $\alpha 2$ (X1 to X3, X5 to X8), the controller 12 executes speed feedback control on the sliding door 1 in a first control cycle T1. When the sliding door 1 is in the second control region $\beta$ (X3 to X4), the controller executes speed feedback control on the sliding door 1 in a second control cycle T2. The controller 12 is configured to optimize the control characteristic for each of the control regions ($\alpha 1$, $\alpha 2$, $\beta$, and $\gamma$).

The control characteristic of the speed feedback control changes in accordance with the control cycle. More specifically, a long control cycle is set to increase stability and reduce hunting in the movement speed V. A short control cycle is set to raise the responsivity and increase the capability for matching the movement speed V with the target speed V.

Accordingly, the controller 12 sets the first control cycle T1 as a basic control cycle for the first control regions α1 and α2. Further, the controller 12 sets the second control cycle T2 that is shorter than the first control cycle T1, which is the basic control cycle, for the second control region β to execute speed feedback control on the sliding door 1. In the present embodiment, this reduces hunting in the movement speed V at the fixed-speed sections Ds1 and Ds2 and obtains high responsivity to the target speed V* that is gradually decreased from the first movement speed V1 to the second movement speed V2 in the deceleration section Dd.

The section from the movement position X4 to the movement position X6 is referred to as a curved portion passage section Dp, in which the sliding door 1 that moves along the guide rail 22 passes through the curved portion 25a (refer to FIG. 2) of the movement path 25.

The controller 12 sets the section from the movement position X4 to the movement position X5 that is included in the curved portion passage section Dp (X4 to X6) as a third control region γ. The third control region γ corresponds to the curved portion passage section Dp (X4 to X6). In the third control region γ, speed feedback control is executed on the sliding door 1 in the first control cycle T1 that is the same as the first control regions α1 and α2.

More specifically, in the third control region γ, the controller 12 changes the control cycle of the speed feedback control to the first control cycle T1, which is longer than the second control cycle T2 of the second control region β used before the sliding door 1 reaches the third control region γ. This lowers the responsivity of the speed feedback control in the third control region γ.

When the sliding door 1 passes through the curved portion 25a of the movement path 25, the centrifugal force that acts on the sliding door 1 raises the movement speed V of the sliding door 1. Thus, it is difficult to lower the movement speed V of the sliding door 1 in the latter half of the deceleration section Dd (X4 to X5) that is overlapped with the curved portion passage section Dp. More specifically, the deviation of the actual movement speed V from the gradually decreased target speed V* results in the tendency of the control output (deceleration component) becoming excessive. As a result, after the sliding door 1 passes through the curved portion 25a of the movement path 25 (e.g., vicinity of movement position X6 in fixed-speed section Ds2), the movement speed V of the sliding door 1 overshoots the target speed V*. This may cause hunting in the movement speed V of the sliding door 1.

Accordingly, in the third control region γ, the controller 12 changes the control cycle of the speed feedback control to the first control cycle T1, which is longer than the second control cycle T2 for the second control region β. Thus, the responsivity of the speed feedback control is lowered to limit the generation of an excessive control output that would be caused by the deviation between the target speed V* and the movement speed V when centrifugal force is generated. This reduces overshooting after the sliding door 1 passes through the curved portion 25a of the movement path 25 and stably keeps the movement speed V of the sliding door 1 fixed at the second movement speed V2 in the fixed-speed section Ds2.

The processing procedures of the sliding door opening-closing drive control executed by the controller 12 will now be described.

Figure 4:
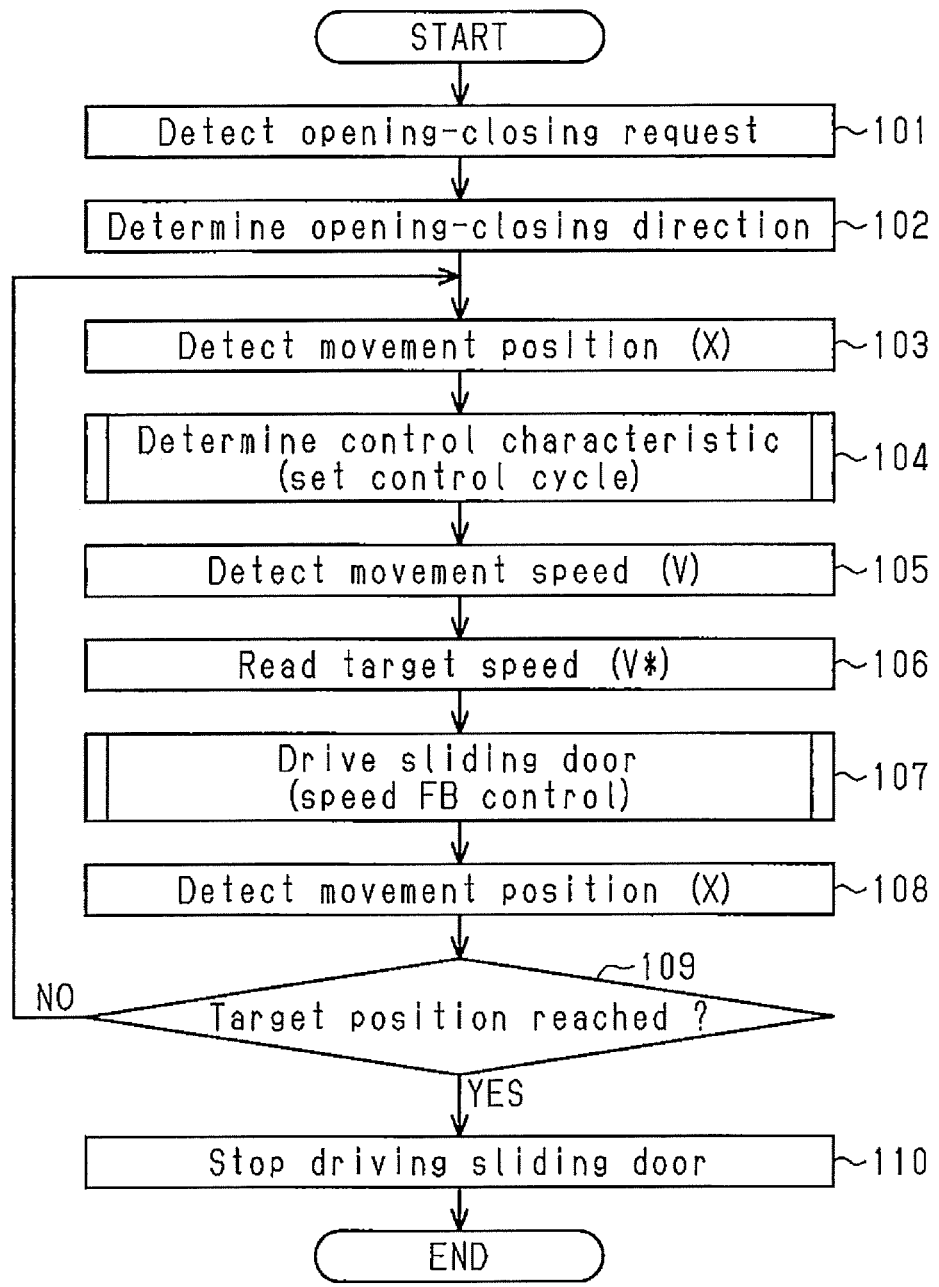
FIG. 4 is a flowchart showing the processing procedures of a sliding door opening-closing drive control.

Referring to the flowchart of FIG. 4, the controller 12 detects an opening-closing request from the user based on an operation input signal Sc (step 101), determines the opening-closing direction of the sliding door 1 (step 102), and starts the sliding door opening-closing drive control (step 103 to step 110).

In detail, the controller 12 first detects the movement position X of the sliding door 1 based on the pulse signal Sp received from the pulse sensor 32 of the driver 11 (step 103). The controller 12 sets the control cycle of the sliding door opening-closing control based on the movement position X of the sliding door 1 to drive the sliding door 1 and determine the control characteristic of the executed speed feedback control (step 104).

Figure 5:
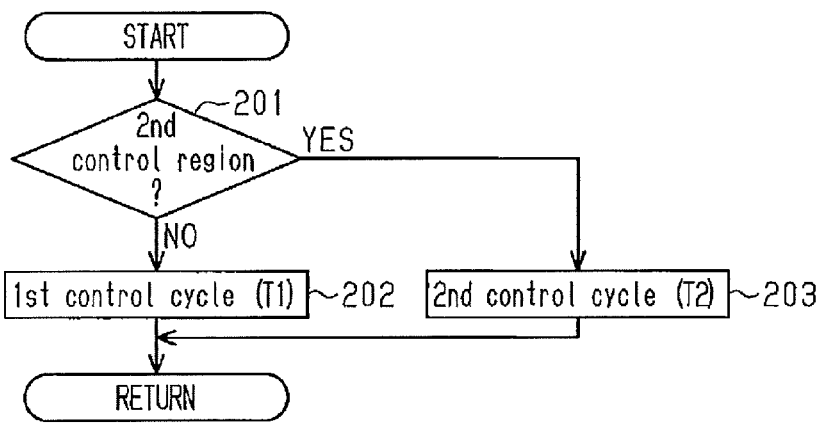
FIG. 5 is a flowchart showing the processing procedures of a control characteristic determination process.

Referring to the flowchart of FIG. 5, in the control characteristic determination process, the controller 12 determines whether or not the detected movement position X of the sliding door 1 is in the second control region β (step 201). When the detected movement position X of the sliding door 1 is not in the second control region β (step 201: NO), the controller 12 sets the first control cycle T1, which is the basic control cycle (step 202). When the movement position X is in the second control region β (step 201: YES), the controller 12 sets the second control cycle T2, which is the short control cycle (step 203).

Referring to the flowchart of FIG. 4, the controller 12 then detects the movement speed V of the sliding door 1 based on the pulse signal Sp received from the pulse sensor 32 (step 105). The controller 12 reads the target speed V* from the memory 33 (step 106). In order to match the actually detected movement speed V with the target speed V*, the controller 12 controls the operation of the driver 11 and moves the sliding door 1 in the opening or closing direction by executing speed feedback control (step 107).

The controller 12 then detects the movement position X of the sliding door 1 again (step 108) and determines whether or not the sliding door 1 has reached the target position (fully closed position Xc in drive mode shown in FIG. 3) (step 109). The controller 12 repeats the processes of steps 103 to 109 until determining that the sliding door 1 has reached the target position (step 109: NO).

In step 104, the control cycle of the sliding door opening-closing drive control set by the controller 12 is the cycle for repeating steps 103 to 109, that is, the control cycle of the speed feedback control executed in step 107. When the controller 12 determines in step 109 that the sliding door 1 has reached the target position (step 109: YES), the controller 12 stops driving the sliding door 1 with the driver 11 (step 110).

The present embodiment has the advantages described below.

(1) The power sliding door device 20, which serves as the vehicle opening-closing body controller, includes the driver 11, which drives the sliding door 1 that serves as an opening-closing body, and the controller 12, which controls the operation of the driver 11. The controller 12 executes the speed feedback control to move the sliding door 1 in the opening direction or the closing direction while controlling the movement speed V of the sliding door 1. Further, the controller 12 sets a plurality of control regions (α1, α2, β, and γ) in the movement route of the sliding door 1. The controller 12 changes the control characteristic of the speed feedback control for each control region.

The above structure allows the control regions to be set to the control characteristics that are optimum for the features of speed changes that occur when the sliding door 1 passes the control regions (α1, α2, β, and γ). This stably opens or closes the sliding door 1 and reduces hunting in the movement speed V while obtaining a high matching capability for the target speed V.

(2) The movement route of the sliding door 1 includes the fixed-speed section Ds1 in which the movement speed V of the sliding door 1 is kept fixed at the first movement speed V1, the fixed-speed section Ds2 in which the movement speed V of the sliding door 1 is kept fixed at the second movement speed V2, and the deceleration section Dd that gradually decreases the movement speed V of the sliding door 1 from the first movement speed V1 to the second movement speed V2. The control regions include the first control region α1 that corresponds to the fixed-speed section Ds1, the first control region α2 that corresponds to the fixed-speed section Ds2, and the second control region β that corresponds to the deceleration section Dd. When the sliding door 1 is in the second control region β (X3 to X4), the controller 12 executes speed feedback control in the second control cycle T2 that is shorter than the first control cycle T1 used when the sliding door 1 is in the first control regions α1 and α2 (X1 to X3, X5 to X8).

In the second control region β, a short control cycle is set for the speed feedback control to raise the responsivity and increase the capability for matching the movement speed V with the target speed V*. Accordingly, the above structure obtains a high matching capability for the target speed V* that is gradually decreased in the deceleration section Dd while reducing hunting of the movement speed V in the fixed-speed sections Ds1 and Ds2.

In particular, the smoothness of deceleration has a tendency to affect the perceptive evaluation of the user such as the feel of operation or the feel of quality in the sliding door 1. The above structure guarantees smooth deceleration of the sliding door 1 and improves the product characteristic.

Further, the control cycle is changed to change the control characteristic of the speed feedback control. This allows the control characteristic of the feedback control to be changed through a relatively simple process. Thus, the control contents are not difficult, the increase in the data amount is limited, and costs are lowered.

(3) The movement path 25 of the sliding door 1, which moves along the guide rail 22, includes the curved portion 25a that is based on the shape of the guide rail 22. The movement route of the sliding door 1 includes the curved portion passage section Dp, in which the sliding door 1 passes through the curved portion 25a. The control regions include the third control region γ that corresponds to the curved portion passage section Dp. In the third control region γ, speed feedback control is executed on the sliding door 1 in the first control cycle T1, which is longer than the second control cycle T2 used before the sliding door 1 reaches the third control region γ.

When the sliding door 1 passes through the curved portion 25a set in the movement path 25, centrifugal force raises the movement speed V of the sliding door 1. This results in the tendency for the movement speed V to deviate from the target speed V*. The deviation may generate an excessive control output that causes the movement speed V of the sliding door 1 to overshoot the target speed V* after the sliding door 1 passes through the curved portion 25a of the movement path 25. This may cause hunting in the movement speed V of the sliding door 1.

However, in the above structure, the control cycle of the speed feedback control is set to be long in the third control region γ to lower the responsivity of the speed feedback control. This limits the generation of an excessive control output caused by the deviation between the target speed V* and the movement speed V when centrifugal force is generated, reduces overshooting after passing through the curved portion 25a of the movement path 25, and reduces hunting in the movement speed V that would be caused by the overshooting. As a result, the movement speed V of the sliding door 1 can be controlled further stably.

(4) The fixed-speed section Ds2 follows the deceleration section Dd. The curved portion passage section Dp traverses the deceleration section Dd and the fixed-speed section Ds2. Further, the third control region γ is set in correspondence with the curved portion passage section Dp.

With the sliding door 1, smoothness in deceleration and stable fixed speed movement subsequent to the deceleration have a tendency to affect the perceptive evaluation of the user. In this regard, the movement speed V that has been decreased in the deceleration section Dd is further stably held in the subsequent fixed-speed section Ds2. This further improves the product characteristic.

The above embodiment may be modified as described below.

In the above embodiment, the vehicle opening-closing body controller is embodied in the power sliding door device 20 that opens and closes the sliding door 1, which is arranged on the side surface of the vehicle. Instead, the vehicle opening-closing body controller may be embodied in other power door devices such as a swing type door and a back door or luggage door arranged at the rear of the vehicle. The present invention may also be applied to a vehicle opening-closing body controller that controls an opening-closing body other than a door such as a sunroof device or a power window device.

In the above embodiment, the movement position X of the sliding door 1 and the movement speed V are detected from the pulse signal Sp output by the pulse sensor 32, which is arranged on the driver 11 (drum 30) but may be detected through any method. The structure of the driver 11 may also be changed in any manner.

The above embodiment exemplifies the drive mode that moves the sliding door 1 with the power sliding door device 20 from the fully open position Xo to the fully closed position Xc and describes the control regions (α1, α2, β, and γ) set for the drive mode and a control that changes the control cycles (T1 and T2) of the speed feedback control for each control region (refer to FIG. 3).

In addition, for other drive modes of the power sliding door device 20, a process may be executed to set a plurality of control regions for the movement route of the sliding door 1 and determine the control characteristic of each control region.

For example, a control characteristic determination process may be executed on a drive mode that moves the sliding door 1 from the fully closed position Xc to the fully open position Xo. In this case, in FIG. 3, the movement position X1 at the fully open position Xo is exchanged with the movement position X8 at the fully closed position Xc and the portion set as the third control region γ (X4 to X5) is changed to the second control region β. Further, a control characteristic determination process may be executed on a drive mode that moves the sliding door 1 that is ajar to the fully open position Xo or the fully closed position Xc.

In the above embodiment, the deceleration section Dd that gradually decreases the movement speed V of the sliding door 1 is set as the varying-speed section, and the second control region β is set to correspond with the deceleration section Dd. Instead, the acceleration sections Di1 and Di2 that gradually increases the movement speed V of the sliding door 1 may be set as the varying-speed section, and the second control region β may be set to correspond with one of the acceleration sections Di1 and Di2.

When setting the control regions, the control region does not necessarily have to completely coincide with the corresponding section. For example, like the relationship of the fixed-speed section Ds1 and Ds2 and the first control regions α1 and α2, the control regions (α1 and α2) may entirely include the corresponding sections (Ds1 and Ds2). Like the relationship of the deceleration section Dd and the second control region β and the relationship of the curved portion passage section Dp and the third control region γ, the control regions (β and γ) may be entirely included in the corresponding sections (Dd and Dp). Each control region may include only a portion of the corresponding section.

In the above embodiment, in the third control region γ, speed feedback control is executed on the sliding door 1 in the first control cycle T1 that is the same as the first control regions α1 and α2. However, the responsivity of the speed feedback control in the third control region γ only needs to be lower than that before reaching the third control region γ, that is, the control cycle of the third control region γ only needs to be longer than the second control cycle T2 of the second control region β. In other words, the control cycle of the third control region γ may differ from the first control cycle T1 of the first control regions α1 and α2 and be a control cycle (T3) that is longer than the second control cycle T2 of the second control region β.

Figure 6:
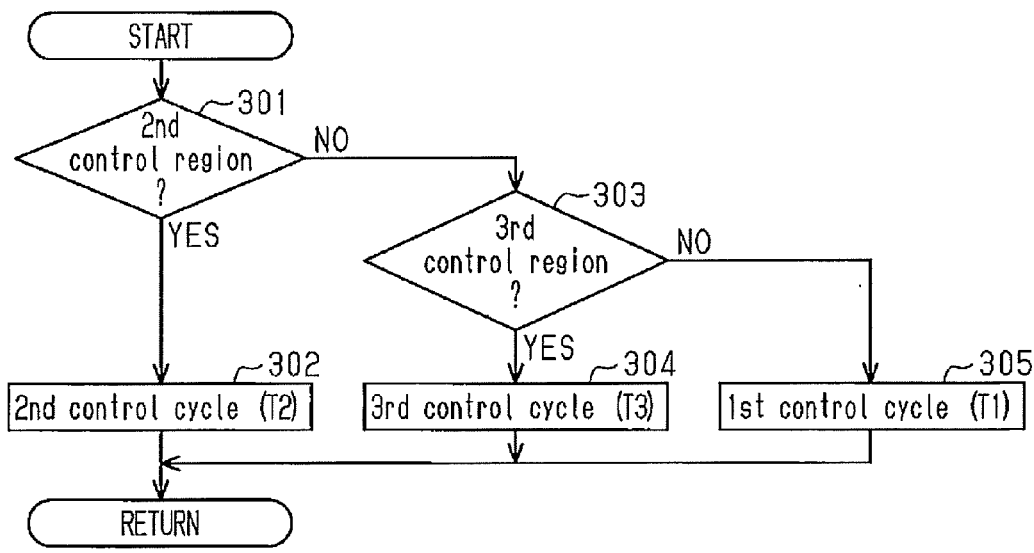
FIG. 6 is a flowchart showing the processing procedures of a control characteristic determination process in a further example.

For example, referring to the flowchart of FIG. 6, in the process for determining the control characteristic (refer to FIG. 4, step 104), it is first determined whether or not the detected movement position X of the sliding door 1 is in the second control region β (step 301). When the detected movement position X of the sliding door 1 is in the second control region β (step 301: YES), the second control cycle T2 is set (step 302).

In step 301, when the detected movement position X of the sliding door 1 is not in the second control region β (step 301: NO), it is then determined whether or not the movement position X is in the third control region γ (step 303). When the movement position X of the sliding door 1 is in the third control region γ (step 303: YES), a third control cycle T3 is set (step 304), and when the movement position X is not in the third control region γ (step 303: NO), the first control cycle T1 is set (step 305).

Further, in the above embodiment, the first control regions α1 and α2 are set to the same first control cycle T1. However, the first control regions α1 and α2 may be set to different control cycles. Like the above modified example, when setting the second control region β in correspondence with the acceleration sections Di1 and Di2, the control cycle of the second control region β may differ from the control cycle of the second control region β corresponding to the deceleration section Dd. More specifically, the control characteristic of the speed feedback control may be changed in any manner for each control region set in the movement route of the sliding door 1.

In the above embodiment, the third control region γ is set in correspondence with the curved portion passage section Dp that traverses the deceleration section Dd and the fixed-speed section Ds2. In addition, the third control region γ may be set in correspondence with the curved portion passage section Dp when the curved portion passage section Dp is overlapped with any one of the acceleration sections Di1 and Di2, the deceleration section Dd, and the fixed-speed sections Ds1 and Ds2. When setting a long control cycle for the third control region γ so that the responsivity of speed feedback control for the third control region γ is lower than that before reaching the third control region γ, overshooting is reduced and hunting in the movement speed V that would be caused by hunting is reduced in the same manner as the above embodiment.

In the above embodiment, the control characteristic of the speed feedback control is changed by changing the control cycle. However, the control gain may be changed to change the control characteristic of the speed feedback control.

Figure 7:
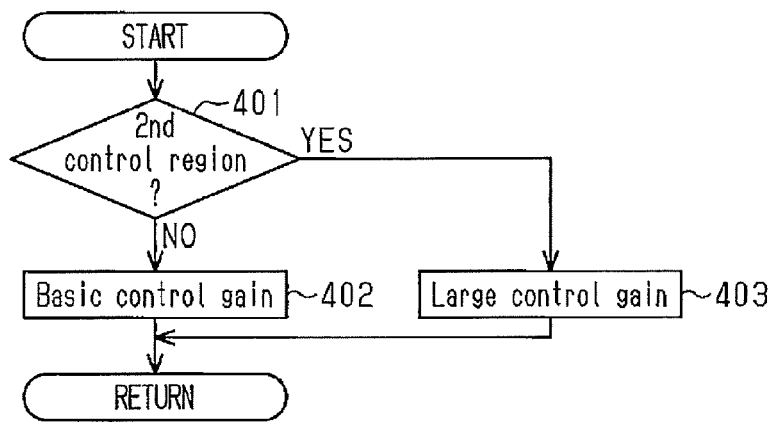
FIG. 7 is a flowchart showing the processing procedures of a control characteristic determination process in a further example.

For example, as shown by the flowchart in FIG. 7, in the process for determining the control characteristic (refer to FIG. 4, step 104), it is first determined whether or not the detected movement position X of the sliding door 1 is in the second control region β (step 401). When the movement position X is not in the second control region β (step 401: NO), a control gain corresponding to the basic control characteristic is set (basic control gain: step 402). When the movement position X is in the second control region β (step 401: YES), the control gain is set so that the responsivity is higher than that when the basic control gain is set (large control gain, step 403). Such a configuration has the same advantages as the above embodiment.

The specific contents of the speed feedback control (refer to FIG. 4, step 107) may be set in any manner. For example, proportional control, integral control, derivative control may be combined in any manner. When changing the control cycle by changing the control gain as described above (refer to FIG. 6), the feedback gain (proportional, integral, derivative), which is multiplied by the deviation of the movement speed V from the target speed V* may be changed for each control region. Any other type of compensation control (friction compensation, inertia compensation, or the like) may also be set.

In the above embodiment, the controller 12 uses the memory 33 to store the target speed V* of the sliding door 1 in correspondence with the movement position X of the sliding door 1 in the form of a map (refer to FIG. 3) and store the control regions (α1, α2, β, and γ) in correspondence with the movement position X of the sliding door 1 in the form of a map. However, the target speed V* and the control regions (α1, α2, β, and γ) may be stored in the memory 33 in the form of a map corresponding to, for example, the elapsed time from when driving starts and do not necessarily have to be stored in correspondence with the movement position X of the sliding door 1. The target speed V* and the control regions (α1, α2, β, and γ) may be stored in the memory 33 by, for example, a combination of management tables and do not necessarily have to be stored as a two-dimensional map such as that shown in FIG. 3.

The type of control region set in the movement route of the sliding door 1 is not necessarily limited to the first control regions α1 and α2, the second control region β, and the third control region γ described in the above embodiment. The control regions set in the movement route of the sliding door 1 do not necessarily have to be adjacent to one another.

The invention claimed is:
1. A vehicle opening-closing body controller comprising:
 a driver that drives an opening-closing body of a vehicle; and
 a control unit that controls operation of the driver, wherein the control unit is configured to
  move the opening-closing body while controlling movement speed of the opening-closing body by executing speed feedback control, and set a plurality of control regions in a movement route of the opening-closing body and change a control characteristic of the speed feedback control for each control region, wherein a movement path of the opening-closing body includes a curved portion, the movement route of the opening-closing body includes a curved portion passage section, in which the opening-closing body passes through the curved portion, the control regions include a control region that corresponds to the curved portion passage section, and the control unit is configured to lower responsivity of the speed feedback control in the control region corresponding to the curved portion passage section from the responsivity of the speed feedback control before the opening-closing body reaches the control region corresponding to the curved portion passage section.

2. The vehicle opening-closing body controller according to claim 1, wherein the control unit is configured to change the control characteristic of the speed feedback control by changing a control cycle, in which the speed feedback control is executed.

3. A vehicle opening-closing body controller comprising:
a driver that drives an opening-closing body of a vehicle; and
a control unit that controls operation of the driver, wherein the control unit is configured to
move the opening-closing body while controlling movement speed of the opening-closing body by executing speed feedback control, and
set a plurality of control regions in a movement route of the opening-closing body and change a control characteristic of the speed feedback control for each control region, wherein the movement route of the opening-closing body includes a fixed-speed section, in which the movement speed of the opening-closing body is kept fixed, and a varying-speed section, in which the movement speed of the opening-closing body is gradually varied, the control regions include a first control region that corresponds to the fixed-speed section and a second control region that corresponds to the varying-speed section, and the control unit is configured to increase responsivity of the speed feedback control in the second control region from responsivity of the speed feedback control of the first control region, a movement path of the opening-closing body includes a curved portion, the movement route of the opening-closing body includes a curved portion passage section, in which the opening-closing body passes through the curved portion, the control regions include a third control region that corresponds to the curved portion passage section, and the control unit is configured to lower the responsivity of the speed feedback control in the third control region from the responsivity of the speed feedback control before the opening-closing body reaches the third control region.

4. The vehicle opening-closing body controller according to claim 3, wherein the varying-speed section is a deceleration section, in which the opening-closing body is decelerated.

5. The vehicle opening-closing body controller according to claim 4, wherein
the fixed-speed section follows the deceleration section, and
the curved portion passage section traverses the deceleration section and the fixed-speed section.

* * * * *